United States Patent [19]
Myers

[11] Patent Number: 4,732,964
[45] Date of Patent: Mar. 22, 1988

[54] COPOLYESTER HOT MELT ADHESIVE

[75] Inventor: Richard E. Myers, Stow, Ohio

[73] Assignee: The Goodyear Tire & Rubber Company, Akron, Ohio

[21] Appl. No.: 18,308

[22] Filed: Feb. 24, 1987

[51] Int. Cl.$^4$ .................. C08G 63/16; C08G 63/18
[52] U.S. Cl. .................................. 528/302; 428/343; 428/480; 528/305
[58] Field of Search ............. 428/343, 480; 528/302, 528/305

[56] References Cited

U.S. PATENT DOCUMENTS

| | | | |
|---|---|---|---|
| 3,926,920 | 12/1975 | Gergoudis et al. | 528/302 |
| 4,094,721 | 6/1978 | Sturm et al. | 528/302 |
| 4,252,940 | 2/1981 | Sublett | 528/302 |
| 4,363,853 | 12/1982 | Imamura et al. | 428/480 |
| 4,452,853 | 6/1984 | Schade et al. | 528/301 |
| 4,500,575 | 2/1985 | Taira et al. | 428/35 |

Primary Examiner—Lucille M. Phynes
Attorney, Agent, or Firm—Alvin T. Rockhill

[57] ABSTRACT

This invention relates to a hot melt adhesive which is particularly useful for securing textile substrates together. The hot melt adhesives of this invention are crystallizable copolyesters which are comprised of repeat units which are derived from terephthalic acid, isophthalic acid, ethylene glycol, and hexamethylene glycol. They normally have melting points within the range of about 95° C. to about 125° C. and glass transition temperatures within the range of about 0° C. to about 10° C. This invention is also related to a process for securing substrates to one another by utilizing such hot melt adhesives.

11 Claims, No Drawings

COPOLYESTER HOT MELT ADHESIVE

BACKGROUND OF THE INVENTION

Hot melt adhesives are bonding compositions which achieve a solid state and resultant strength by cooling as contrasted with other adhesives, such as emulsion or lacquer adhesives, which achieve the solid state through evaporation or removal of solvent. A hot melt adhesive is normally a solid thermoplastic material. The application of heat melts the solid hot melt adhesive and after the heat source is removed, it solidifies simply by cooling. This is in direct contrast to thermosetting adhesives which set or harden by the application of heat and which remain hard upon continued application of heat.

Hot melt adhesives are widely used in packaging, shoe manufacturing, and other industries and are particularly useful because of their tackiness in the molten state and the speed with they form strong bonds. However, utilization of these combinations is, at times, limited because of certain undesirable properties which adversely affect their overall performance. For example, high melt viscosity makes the adhesives hard to apply to the surface of the substrate, and poor heat stability results in thermal degradation.

In order to yield satisfactory results in commercial usage, hot melt adhesive compositions must possess several other properties, in addition to the necessary degree of tackiness at the application temperature. In particular, these compositions must display a low viscosity at the application temperature so as to easily wet the surface of the substrate and also possess heat stability to minimize molecular degradation due to prolonged heating, oxidation, and hydrolysis.

It is important for hot melt adhesives which are applied to heat-sensitive materials, such as textiles, to have relatively low melting points. However, an excessively low viscosity in the melt is disadvantageous in textile lamination. In this case, the object is to bond a facing material to a lining material such that the laminant will retain the textile character. Fusion adhesives in powder form are preferred in textile lamination. Such powders are sintered onto the lining material, usually woven fabrics, by means of special applicator systems, and then cemented to the facing materials with the application of heat and pressure. Hot melt adhesives which are highly resistant to dry cleaning fluids are also needed in such textile applications.

SUMMARY OF THE INVENTION

The present invention reveals a crystalline copolyester having a low melting point which is typically within the range of about 95° C. to about 125° C. which can be utilized as a hot melt adhesive. The copolyesters of this invention are also resistant to conventional dry cleaning solvents and laundry detergents and can accordingly be used in the garment industry for joining textile fabrics and substrates together.

The subject invention more specifically discloses a copolyester which is particularly useful as a hot melt adhesive which is comprised of repeat units which are derived from (1) a diacid component which consists essentially of (1) from 70 to 90 mole percent terephthalic acid and (2) from 10 to 30 mole percent isophthalic acid; and (b) a diol component which consists essentially of (1) from 10 to 20 mole percent ethylene glycol and (2) from 80 to 95 mole percent hexamethylene glycol.

It is surprising that the thermoplastic copolyesters of this invention have good crystallinities in spite of their low melting points, since it would normally be expected for them to be amorphous, or at best to have such low crystallinities that they would nevertheless be useless as fusion adhesives which resist the action of typical dry cleaning fluids. However, it has been determined that the copolyesters of this invention resist common dry cleaning solvents. Accordingly, the copolyesters of this invention can be characterized as having a solubility in 1,1,2,2-tetrachloroethylene at 25° C. of less than 0.3%.

DETAILED DESCRIPTION OF THE INVENTION

The crystallizable copolyesters of this invention are prepared by reacting a diacid component with a diol component. The diacid component utilized is a mixture of terephthalic acid and isophthalic acid. The diol component utilized is a mixture of ethylene glycol and hexamethylene glycol.

The diacid component can, of course, be a diester, such as dimethyl terephthalate. The term "diacid component" as used herein is therefore intended to include diesters. The term "diol component" as used herein is also deemed to include glycol ethers (diethers). These polyester compositions can be made in any conventional manner well known in the art. Thus, conventional temperatures, catalysts, amounts of catalysts, stabilizers, and the like, are used in manners well known in the literature and art.

A three step process can be utilized in preparing the crystallizable copolyesters of this invention. The steps in such an operation typically consist essentially of (1) transesterification of a terephthalic acid ester with the dihydric alcohol, (2) direct esterification of the transesterification product with isophthalic acid and terephthalic acid and (3) polycondensation of the alcohol ester thus formed in the presence of a catalyst at high temperatures. The transesterification and direct esterification steps are preferably carried out in an inert atmosphere and in the presence of appropriate catalysts, such as titanium alkoxides or zinc acetates. Such techniques require overall reaction temperatures ranging from about 180° C. to 290° C. over a period of at least 4 hours. The actual temperature range and duration of the reaction will depend considerably on the reactants and catalysts used. The extent of polycondensation will depend on the desired molecular weight of the copolyester. Alternately, these copolyesters may be prepared directly from their dialkyl esters depending on availability and ease of handling. Typical melt polymerization techniques involving transesterification reactions are described by Whinfield et al. U.S. Pat. No. 2,465,319 and inter alia, Snyder, U.S. Pat. No. 2,623,031. Additional information relating to the preparation of similar copolyesters may be obtained from "Polymers and Resins" by B. Golding, D.Van Nostrand Co., Inc. (1959)P.283-9.

The diol component of the mixtures reacted to form the crystallizable copolyesters of this invention should be sufficient in amount to ensure complete transesterification. For this reason, it is ordinarily advantageous to utilize an amount of diol component in excess of the stoichiometric amount required. The amount of terephthalic and isophthalic acid utilized in the diacid component will be adjusted so as to produce a copolyester containing from 70 to 90 mole percent bound terephthalic acid and from 10 to 30 mole percent bound isophthalic acid, based upon the total amount of diacid component in the copolyester. In other words, from 70 to 90 mole percent of the diacid repeat units in such copolyesters will be derived from terephthalic acid and from 10 to 30 mole percent of the diacid repeat units in such copolyesters will be derived from isophthalic acid. The amount of ethylene glycol and hexamethylene glycol utilized will be adjusted so as to prepare a copolyester containing from 10 to 20 mole percent ethylene glycol and from 80 to 90 mole percent hexamethylene glycol. In other words, from 10 to 20 mole percent of the diol repeat units in such copolyesters will be derived from ethylene glycol and from 80 to 90 mole percent of the diol repeat units in such copolyesters will be derived from hexamethylene glycol. Because of the large difference in the volatility of ethylene glycol and hexamethylene glycol, there is typically a very substantial difference between their charged and bound ratios. The precise ratio of ethylene glycol to hexamethylene glycol required in the monomer charged to attain a given bound ratio of ethylene glycol to hexamethylene glycol will vary with the reaction conditions and reactor design utilized but can be ascertained by persons having ordinary skill in the art utilizing conventional engineering procedures. For instance, in a typical reactor a charged ratio of ethylene glycol to hexamethylene glycol of 40:60 to 55:45 was required in order to attain a bound ratio of 10:90 to 20:80.

The crystallizable copolyesters of this invention will typically be derived from a diacid component which contains from 70 to 90 mole percent terephthalic acid and from 10 to 30 mole percent isophthalic acid. It is normally preferred for the bound diacid component to contain from 75 to 85 mole percent terephthalic acid and from 15 to 25 mole percent isophthalic acid. The bound diol component in such crystallizable copolyesters will be comprised of from 10 to 20 mole percent ethylene glycol and from 80 to 90 mole percent hexamethylene glycol. It is normally preferred for the bound diol component to consist of from 15 to 18 mole percent ethylene glycol and from 82 to 85 mole percent hexamethylene glycol.

The resulting hot melt adhesive composition can be drawn off and may be used immediately in hot pots. It may also be molten-extruded into rope form or converted into pellets, rods, cylinders, slugs or billets, or it may be granulated or diced depending upon the equipment which will subsequently be used to apply the hot melt. As another alternative, the freshly prepared adhesive may be placed into cooling pans and held in bulk form for later use.

Optionally, the adhesive may be coated onto a conventional silicone-coated release paper and stored until needed at which time the adhesive film can be stripped from the release paper and applied to a selected substrate.

When the adhesive of this invention is activated by heating to a temperature above its melting point, it becomes tacky and capable of forming adhesive bonds.

Although the copolyesters of this invention are satisfactory hot melt adhesives in themselves, conventional additives may be incorporated, if desired, to modify certain properties of the films cast therefrom. Conventional additives or diluents such as tackifying resins, antistatic agents, flameproofing agents, plasticizers, stabilizers or colorants may be used.

Fillers such as are commonly employed as loading agents in adhesives, may also be added to the adhesives of this invention, if desired. Examples of such fillers include clay, talc, silica, calcium carbonate, and the like. The fillers can be added during the preparation of the adhesives or compounded at a later time, and mixtures of two or more fillers may also be used.

All of the novel hot melt adhesives of this invention may be utilized in a wide variety of applications such, for example, as adhesives for natural and synthetic fabrics used in clothing, paper, leather, and cardboard used for containers, etc.

The actual application of the hot melt adhesives of this invention may be accomplished by the use of any conventional hot melt equipment. Ordinarily, the adhesive is first premelted in an applicator pot which is at a temperature of about 100° to about 140° C. An applicator roll or extrusion nozzle can then be used to apply either an overall coating or a patterned strip or a continuous bead of the adhesive to any desired substrate; the film coating should have a final dry thickness of from about 0.5–4.0 mils. The thus coated substrate should then be immediately applied or transferred to the surface of the substrate to which it is to be adhered. As the adhesive coating cools down to room temperature, the bonding process will be completed.

In the manufacture of shoes, a thermoplastic deformable synthetic material is normally used as a stiffening cap. This material, preferably in the form of long strips, can be coated with the copolyesters of this invention as a hot melt adhesive. After the hot melt adhesive has solidified, the stiffening cap blanks are stamped out and are bonded to the shoe upper material under the simultaneous action of heat and pressure. In a further operation, the adhesive coated inner lining of the shoe is likewise cemented under the action of heat and pressure to this sandwich, so that the stiffening caps are disposed between the inner lining of the shoe and the shoe upper material. The shaping of the shoe upper is preferably performed simultaneously with the application of the shoe inner lining material. During the application of the shoe inner lining material, the stiffening cap or stiffening cap blank, as the case may be, must not shift, much less become separated from the shoe upper material. In the process that follows the shoe upper material is cemented to the in sole by the use of fusion adhesives and the simultaneous application of heat and pressure, no shifting or separation of the inner lining from the upper material must take place.

In order to more fully illustrate the nature of this invention and the manner of practicing the same, the following examples are presented. Unless specifically indicated otherwise all parts and percentages are given by weight.

EXAMPLE 1

A crystallizable copolymer having a diol constituent which contains 17 mole percent ethylene glycol and 83 mole percent hexamethylene glycol (based upon the total bound diol component) and a diacid component which contains 80 mole percent terephthalic acid and 20 mole percent isophthalic acid (based upon the total bound diacid component) was prepared utilizing a conventional condensation polymerization technique. The copolyester prepared was determined to have an intrinsic viscosity of 0.79, a carboxyl number of 20, a glass transition temperature of 5° C., and a melting point of 106° C. The crystallization half time for the copolyester prepared was determined to be about 1.7 minutes at 57° C. Crystallization half times of less than 2 minutes are highly desirable in commercial applications. This is because longer crystallization half times tend to limit throughputs.

Resistance to dry cleaning solvents is essential to good performance of textile innerliner adhesives. The resistance of the crystallizable copolyester prepared in this experiment to the most common dry cleaning solvent (1,1,2,2-tetrachloroethylene) was accordingly determined. This was done by soaking cubes which were made of the crystallizable copolyester for three hours in Perclene (1,1,2,2-tetrachloroethylene) followed by air drying the cubes for one hour and then measuring the weight gain. A weight gain of about 2% was measured. This represents very good resistance to the 1,1,2,2-tetrachloroethylene. In fact, after being soaked in the Perclene for 12 hours a weight gain of only 4.8% was measured. This further shows the crystallizable polyester's excellent resistance to the dry cleaning fluid.

The crystallizable copolyester has also been utilized as a fusible innerliner in textile applications. It is reported to have excellent properties for use in textile applications. For instance, it has the required melting point, glass transition temperature, and resistance to dry cleaning solvents.

While certain representative embodiments and details have been shown for the purpose of illustrating this invention, it will be apparent to those skilled in this art that various changes and modifications can be made therein without departing from the scope of the present invention.

What is claimed is:

1. A copolyester which is particularly useful as a hot melt adhesive which is comprised of repeat units which are derived from (a) a diacid component which consists essentially of (1) from 70 to 90 mole percent terephthalic acid and (2) from 10 to 30 mole percent isophthalic acid; and (b) a diol component which consists essentially of (1) from 10 to 20 mole percent ethylene glycol and (2) from 80 to 95 mole percent hexamethylene glycol.

2. A copolyester as specified in claim 1 wherein said diacid component consists essentially of (1) from 75 to 85 mole percent terephthalic acid and (2) from 15 to 25 mole percent isophthalic acid.

3. A copolyester as specified in claim 2 wherein said diol component consists essentially of (1) from 15 to 18 mole percent ethylene glycol and (2) from 82 to 85 mole percent hexamethylene glycol.

4. In a process for securing one substrate to another by disposing between said substrates a heat-fusible material and maintaining the substrates in sufficient juxtaposition until said material has fused and bond one of said substrates to the other, the improvement which comprises employing as the heat-fusible material the copolyester specified in claim 1.

5. In a process for securing one substrate to another by disposing between said substances a heat-fusible material and maintaining the substances in sufficient juxtaposition until said material has fused and bond one of said substances to the other, the improvement which comprises employing as the heat-fusible material the copolyester specified in claim 2.

6. In a process for securing one substance to another by disposing between said substances a heat-fusible material and maintaining the substances in sufficient juxtaposition until said material has fused and bond one of said substances to the other, the improvement which comprises employing as the heat-fusible material the copolyester specified in claim 3.

7. A process according to claim 4 wherein the polyester is disposed between said substances in the form of a molten heated mass.

8. A process according to claim 4 wherein the polyester is disposed between said substances in the form of a solid and thereafter is subjected to sufficient temperature and pressure to join said substances.

9. A process according to claim 4 wherein at least one of said substances is a textile substance.

10. A process according to claim 4 wherein at least one of said substances is a natural or artificial leather.

11. A process according to claim 4 wherein said polyester is disposed between a shoe lining material and a shoe upper material and in such position is subjected to sufficient temperature and pressure to join said lining material to said shoe upper material.

* * * * *